(12) United States Patent
Leung et al.

(10) Patent No.: US 9,805,526 B2
(45) Date of Patent: Oct. 31, 2017

(54) FAULT MONITORING FOR VEHICLES

(71) Applicant: THE BOEING COMPANY, Chicago, IL (US)

(72) Inventors: Jonathan Leung, Everett, WA (US); Brian Pontrello, Shoreline, WA (US); Roxanne Hirst, Everett, WA (US); Cameron L. Carnegie, Everett, WA (US); Rashed M. Noman, Bellevue, WA (US); Johanne Friedrichs, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/966,995

(22) Filed: Dec. 11, 2015

(65) Prior Publication Data
US 2017/0169633 A1  Jun. 15, 2017

(51) Int. Cl.
G07C 5/00 (2006.01)
G07C 5/08 (2006.01)

(52) U.S. Cl.
CPC ......... *G07C 5/0841* (2013.01); *G07C 5/0825* (2013.01)

(58) Field of Classification Search
CPC .............................. G07C 5/0841; G07C 5/0825
USPC ................................................. 701/29.3, 32.4
See application file for complete search history.

(56) References Cited

U.S. PATENT DOCUMENTS

| | | | | |
|---|---|---|---|---|
| 6,301,531 B1 * | 10/2001 | Pierro | ................. | B61L 27/0094 701/19 |
| 6,947,797 B2 * | 9/2005 | Dean | ....................... | B61C 17/04 700/110 |
| 8,359,137 B2 * | 1/2013 | Feder | .................. | B60W 50/038 701/43 |
| 2004/0243287 A1 * | 12/2004 | Yanaka | ................. | B60W 50/02 701/33.6 |
| 2006/0113138 A1 * | 6/2006 | Maron | ................... | B60K 28/10 180/271 |
| 2010/0083056 A1 * | 4/2010 | Spier | .................. | G05B 23/0275 714/47.3 |
| 2013/0246866 A1 * | 9/2013 | Costin | ................... | B60W 50/04 714/55 |
| 2015/0057875 A1 * | 2/2015 | McGinnis | ............ | G05B 19/418 701/31.6 |

* cited by examiner

*Primary Examiner* — Marthe Marc-Coleman
(74) *Attorney, Agent, or Firm* — Patterson + Sheridan, LLP

(57) ABSTRACT

Method and apparatus for calculating probabilities of service interruptions based on fault event indications. Instances of fault event indications are filtered to remove duplicate indications for the same fault event. Then a probability of the fault event indication causing a service interruption is calculated by dividing a number of service interruptions caused by instances of the fault event indication by the number of fault event indications. In the event that a particular fault event indication is associated with a high probability of causing a service interruption, a message can be automatically generated and transmitted upon receipt of a future instance of the service interruption. The message can provide information related to short-term solutions to address the fault event, long-term solutions to address the fault event, and parts and tools for addressing the fault event.

21 Claims, 6 Drawing Sheets

| AIRCRAFT SERIAL NO. | FAULT EVENT INDICATION | TIME OF FAULT EVENT INDICATION | PROBABILITY OF SERVICE INTERRUPTION | FAULT EVENT MESSAGE SENT? |
|---|---|---|---|---|
| 13478 | #4 WHEEL HIGH BRAKE TEMP. | 10:47 AM SEPT. 3, 2015 | 7 % | 10:55 AM SEPT. 3, 2015 |
| 27450 | #4 WHEEL HIGH BRAKE TEMP. | 11:53 PM SEPT. 4, 2015 | 7 % | N ETA: 5 MINS. |
| 04771 | #1 LANDING LIGHT OUT | 11:55 PM SEPT. 4, 2015 | 1 % | N/A |

FIG. 6

FAULT MONITORING FOR VEHICLES

BACKGROUND

Aspects described herein relate to fault monitoring for vehicles, and more specifically, to filtering fault data to remove duplicate fault event indications for a vehicle or fleet of vehicles to calculate a likelihood that the fault event results in a service interruption.

Complex machinery, such as commercial aircraft, occasionally experience equipment faults. Some commercial aircraft and other complex machinery can transmit fault data to one or more computer systems, such as computer systems used by maintenance centers and computer systems operated by the aircraft manufacturer.

SUMMARY

According to one aspect, a computer-implemented method includes receiving a fault event indication from a vehicle. The computer-implemented method also includes determining an amount of time that has elapsed since the vehicle previously output the fault event indication. The computer-implemented method also includes determining a fault event resolution time period for the received fault event indication. The computer-implemented method also includes including the fault event indication in a total number only if the determined amount of time is greater than the determined fault event resolution time period for the received fault event indication. The computer-implemented method also includes, upon receiving an indication that a service interruption occurred as a result of the fault event indication, including the service interruption in a total number of service interruptions that occurred as a result of the fault event indication. The computer-implemented method also includes calculating the probability of a service interruption for the fault event for the vehicle based on the total number of instances of the fault event for the aircraft and a total number of instances of service interruptions for the fault event for the vehicle. The computer-implemented method also includes outputting the calculated probability of a service interruption for the fault event.

According to one aspect, a system includes a computer processor. The system also includes a computer memory containing a program that, when executed on the computer processor, performs an operation for processing data, comprising receiving a fault event indication from a vehicle. The operation further comprises determining an amount of time that has elapsed since the vehicle previously output the fault event indication. The operation further comprises determining a fault event resolution time period for the received fault event indication. The operation further comprises including the fault event indication in a total number only if the determined amount of time is greater than the determined fault event resolution time period for the received fault event indication. The operation further comprises upon receiving an indication that a service interruption occurred as a result of the fault event indication, including the service interruption in a total number of service interruptions that occurred as a result of the fault event indication. The operation further comprises calculating the probability of a service interruption for the fault event for the vehicle based on the total number of instances of the fault event for the aircraft and a total number of instances of service interruptions for the fault event for the vehicle. The operation further comprises outputting the calculated probability of a service interruption for the fault event.

According to one aspect, a computer program product includes a computer-readable storage medium having computer-readable program code embodied therewith. The computer-readable program code is executable by one or more computer processors to receive a fault event indication from a vehicle. The computer-readable program code is also executable to determine an amount of time that has elapsed since the vehicle previously output the fault event indication. The computer-readable program code is also executable to determine a fault event resolution time period for the received fault event indication. The computer-readable program code is also executable to include the fault event indication in a total number only if the determined amount of time is greater than the determined fault event resolution time period for the received fault event indication. The computer-readable program code is also executable to, upon receiving an indication that a service interruption occurred as a result of the fault event indication, include the service interruption in a total number of service interruptions that occurred as a result of the fault event indication. The computer-readable program code is also executable to calculate the probability of a service interruption for the fault event for the vehicle based on the total number of instances of the fault event for the aircraft and a total number of instances of service interruptions for the fault event for the vehicle. The computer-readable program code is also executable to output the calculated probability of a service interruption for the fault event.

BRIEF DESCRIPTION OF THE SEVERAL VIEWS OF THE DRAWINGS

FIG. 6 is an exemplary "dashboard" interface that illustrates fault events being reported by a fleet of vehicles.

DETAILED DESCRIPTION

Figure 1A:
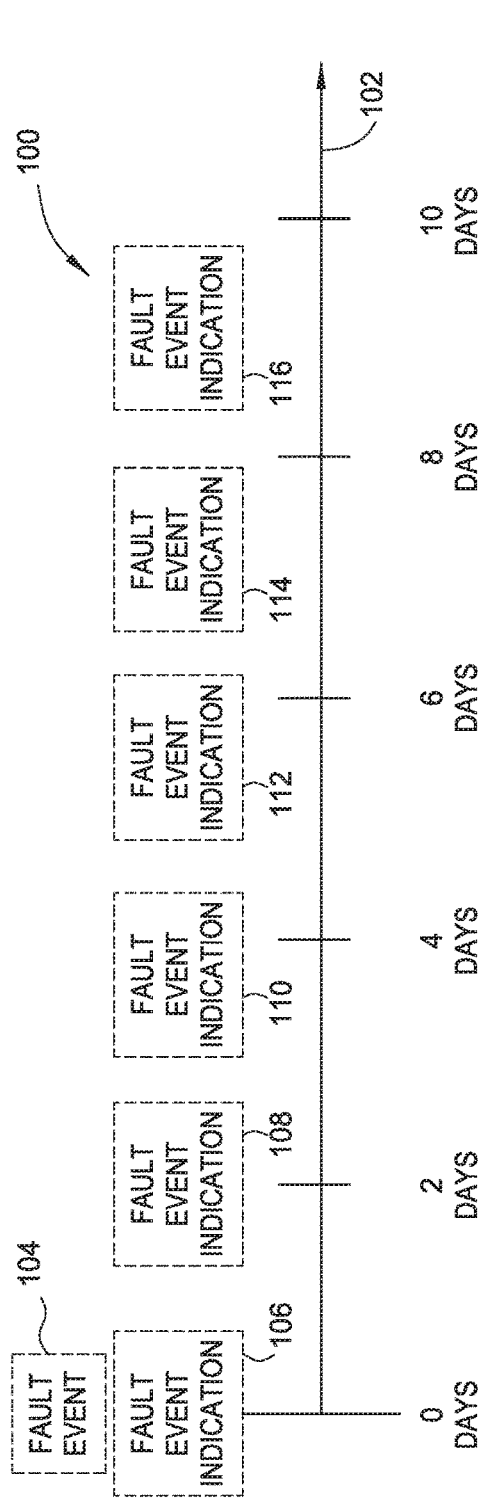
FIG. 1A is an exemplary timeline of a scenario in which a fault event occurs onboard an aircraft and a series of fault event indications are output by the aircraft.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Aircraft, such as commercial aircraft, sometimes have the capability to automatically report information related to various faults, such as a sensor reading out of a nominal range or a component operating outside of design parameters. The automatically reported information is referred to herein as a fault event indication. The reported fault event indications alert the operator of the machinery of the fault event. The fault event indication could also be sent to the aircraft manufacturer or a maintenance provider as well. In some circumstances, the aircraft manufacturer or maintenance provider could send information to the aircraft operator to help the aircraft operator address the fault event indication.

In many instances, such fault event indications are related to systems and/or issues that do not affect the ability of the machinery to perform its mission. For example, an aircraft may continue to operate for some period of time after a brake temperature on the aircraft slightly exceeds a nominal temperature range, which could be an early indicator that brake components will require maintenance and/or replacement soon. For example, the aircraft operator may be able to continue flying for some period of time (e.g., ten days or fifty flights) before addressing the fault event by replacing brake components nearing the end of their service lives or replacing a faulty brake temperature sensor. In the event the aircraft operator continues to operate the aircraft before addressing the fault event, the aircraft may continue to output the fault event indication every time the aircraft is operated.

Regardless of whether the aircraft operator addresses a fault event at the first instance of a fault event indication, the aircraft may experience a service interruption as a result of the fault event indication. As discussed herein, a service interruption is any delay in normal operation of an aircraft over a threshold amount of time that is attributable to a fault event indication. For example, the threshold amount of time may be fifteen minutes for a first particular operator and five minutes for a second operator. At the first instance of a particular fault event indication on a particular aircraft, the aircraft may experience a service interruption while the pilots and maintenance personnel diagnose the fault event and determine whether the scheduled operation of the aircraft can be performed. Assuming that the underlying fault event that caused the fault event indication is one that can wait to be addressed, as discussed above, instances of the fault event indication on subsequent flights likely do not cause service interruptions because the aircraft operator is aware of the fault event indication. In various circumstances, the aircraft operator can provide maintenance operations (e.g., the aircraft manufacturer or a maintenance provider) with information related to which fault event indications cause service interruptions.

As discussed above, maintenance operations can automatically receive information from aircraft when the aircraft output fault event indications. In response, the maintenance operations can send messages to the aircraft operator with information that can help the aircraft operator resolve the underlying fault event that caused the fault event indication. However, sending too many messages to the aircraft operator for every fault event indication output by an aircraft may be overly burdensome for the aircraft operator. To avoid inundating the aircraft operator with messages related to fault event indications, the maintenance operation may filter such fault event indications to identify fault event indications associated with a high probability of a service interruption, wherein the probability of a service interruption is defined herein as:

$$\text{Probability of Service Interruption} = \frac{\text{Total \# of Service Interruptions}}{\text{Total \# of Fault Event Indications}}. \quad (1)$$

A calculation according to Equation (1), above, results in a probability of a service interruption with a numerical value between zero and one. The probability of a service interruption can be converted into a percentage by multiplying the resultant number by one hundred. For example, if a particular fault event indication has occurred twenty times and one of the fault event indications resulted in a service interruption, then the probability of a service interruption is 0.05 or 5%.

The probability of a service interruption can be calculated for a single aircraft, for a class of aircraft operated by a single operator or group of operators, and/or for the class of aircraft operated by all operators. In the context of commercial aircraft, for example, the probability of service interruption could be calculated for a single aircraft, for a type of aircraft (e.g., a Boeing 737-800) operated by a particular airline, or for all instances of a type of aircraft operated by all of the airlines. Different probabilities can be calculated for the different fault event identifications that an aircraft can output. In some instances, two different aircraft may use the same system (e.g., the same make and model of hydraulic pump). In such instances, probabilities of service interruptions related to fault event indications for the hydraulic pump could be combined for the different aircraft types that use that hydraulic pump.

The probability of a service interruption is calculated by the maintenance operation by counting the number of fault event indications received from a particular population of aircraft (e.g., a single aircraft or a class of aircraft) and counting the number of service interruptions reported by the aircraft operator. Then, the maintenance operation divides the counted number of service interruptions by the counted number of fault event indications, as discussed above with reference to Equation (1). If a fault event indication is output by an aircraft, the maintenance operation looks up the calculated probability of a service interruption for that fault event indication (which was calculated based on past instances of the fault event indication). If the calculated probability of a service interruption associated with the fault event indication is above a predetermined threshold level (e.g., 5% or 10%), then the maintenance operation transmits a message to the aircraft operator with information that can help the aircraft operator to address the underlying fault event that caused the fault event indication.

As discussed above, an aircraft operator may continue to operate an aircraft for some period of time after an occurrence of certain types of fault event indications before addressing the underlying fault event. In such instances, the aircraft could output additional fault event indications every time the aircraft is operated. As discussed above, the additional fault event indications are not likely to cause a service interruption because the additional fault event indications are expected by the aircraft operator. However, if the additional fault event indications are counted, the calculated probability of a service interruption could be skewed downwardly. FIG. 1A illustrates a scenario 100 in which a fault event 104 of an aircraft occurs at a zero day mark on a timeline 102. A fault event indication 106 is output by the aircraft in response to the fault event of 104. The fault event indication 106 is specific to the particular fault event. A complex aircraft may be able to output hundreds or thousands of different fault event indications related to different fault events. There could be a service interruption associated with the fault event 104 while the operator of the machine determines the implications of the fault event indication 106. If the fault event indication 106 associated with the fault event 104 on day zero is a first instance of the particular fault event indication 106, then the probability of a service interruption is equal to 100% if there was a service interruption and 0% if there was no service interruption.

In this exemplary scenario 100, assume that the operator can continue to operate the aircraft for up to ten days before addressing the fault. However, every time the machine operates, the aircraft may detect the existing fault event 104 and output a duplicate fault event indication. For example, FIG. 1A illustrates five duplicate fault event indications 108, 110, 112, 114, and 116 occurring before the ten day period has lapsed. These five duplicate fault event indications 108, 110, 112, 114, and 116 likely do not cause service interruptions because the operator of the machine is already aware of the fault event 104 and is expecting the fault event indication 106. If the five duplicate fault event indications 108, 110, 112, 114, and 116 are counted, the calculation of the probability of the service interruption is skewed downwardly. For example, assuming that a service interruption occurred on day zero when the fault event 104 first occurred, then the six total fault event indications 106, 108, 110, 112, 114, and 116 results in a calculated probability of a service interruption for the fault event 104 of 0.167 or 16.7% (compared to 100% for just the first fault event indication, described above). Thus, the additional fault event indications 108, 110, 112, 114, and 116 erroneously decrease the calculated probability that the fault event 104 will cause a service interruption. In the case of a commercial aircraft, which may fly many legs in a day (and wherein each leg generates a fault event indication), the calculation of the probability of a service interruption could be skewed so low that the particular fault event appears to have an insignificant chance of a service interruption associated with it even though the particular fault event indication usually does cause a service interruption when it first occurs.

Figure 1B:
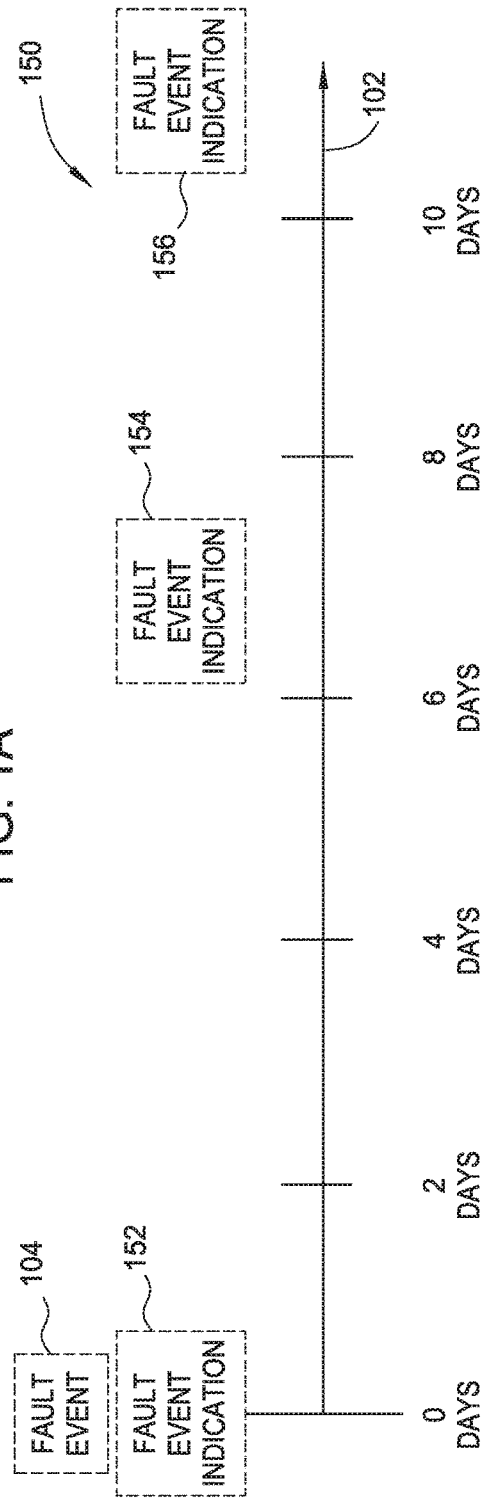
FIG. 1B is another exemplary timeline of another scenario in which a fault event occurs onboard an aircraft and a series of fault event indications are output by the aircraft.

To avoid or reduce the skewing of the calculated probability of the service interruption, aspects described herein do not count duplicate fault event indications. Referring to FIG. 1B, if the fault event 104 occurs on day zero and a fault event indication 152 is output, aspects described herein can ignore subsequent fault event indications that occur within a time period in which the operator of the machine can address the fault event 104. For example, if the operator of the aircraft has ten days to address the faults event 104, then aspects described herein would ignore fault event indications after the fault event indication 152 on day zero that occur within ten days. For example, the fault event indication 154 shown occurring approximately on day seven would be ignored and not included in the calculation for the probability of a service interruption. By contrast, the fault event indication 156 shown occurring after day ten would be counted and included in the calculation for the probability of a service interruption. The fault event indication 156 would be counted because it would be assumed that the operator of the aircraft addressed the fault event 104 such that the fault event indication 156 occurring after day ten is related to a new instance of the fault event 104.

In various instances, an operator of the machine may be able to restart the time period for addressing a fault event if an instance of a fault event indication is not output during every operation of the machine. For example, still referring to FIG. 1B, if the fault event 104 occurs on day zero and the fault event indication 152 is output on day zero, the machine may operate several times thereafter without outputting a fault event indication. For example, the fault event 104 could be related to a sensor that, on day zero, begins to intermittently output erroneous data. Thus, the machine may operate one or more times between day zero and day six without outputting a fault event indication (e.g., because the sensor is outputting correct data during that time). Then, on day seven, the machine may output another fault event indication 154. As discussed above, the lack of fault event indications between day one and day six may allow the operator of the machine to not address the fault event 104 that occurred on day zero. However, the additional fault event indication 154 starts a new ten-day period in which the operator of the machine has to address the fault event 104. Thus, the fault event indication 156 after day ten (e.g., on day eleven) would not be counted because it occurred within ten days of the previous fault event indication 154.

After the fault event indications are filtered to remove duplicate indications, as discussed above, a probability that a particular fault event indication will cause a service interruption is calculated. This process is repeated for each of the different fault event indications that the machine or class of machines can output. As discussed above, the calculated probabilities of the service interruption are correct when the duplicate fault event indications are filtered out. As discussed in greater detail below, when a subsequent fault event indication is output by a machine, the fault event indication is checked against the probability of the service interruption for that fault event indication. In the event the probability of the service interruption is above a predetermined threshold level, a message related to the fault event can be automatically generated and sent. The information in the message could reduce, minimize, and/or eliminate the time required to address the fault event related to the fault event indication.

Figure 2:
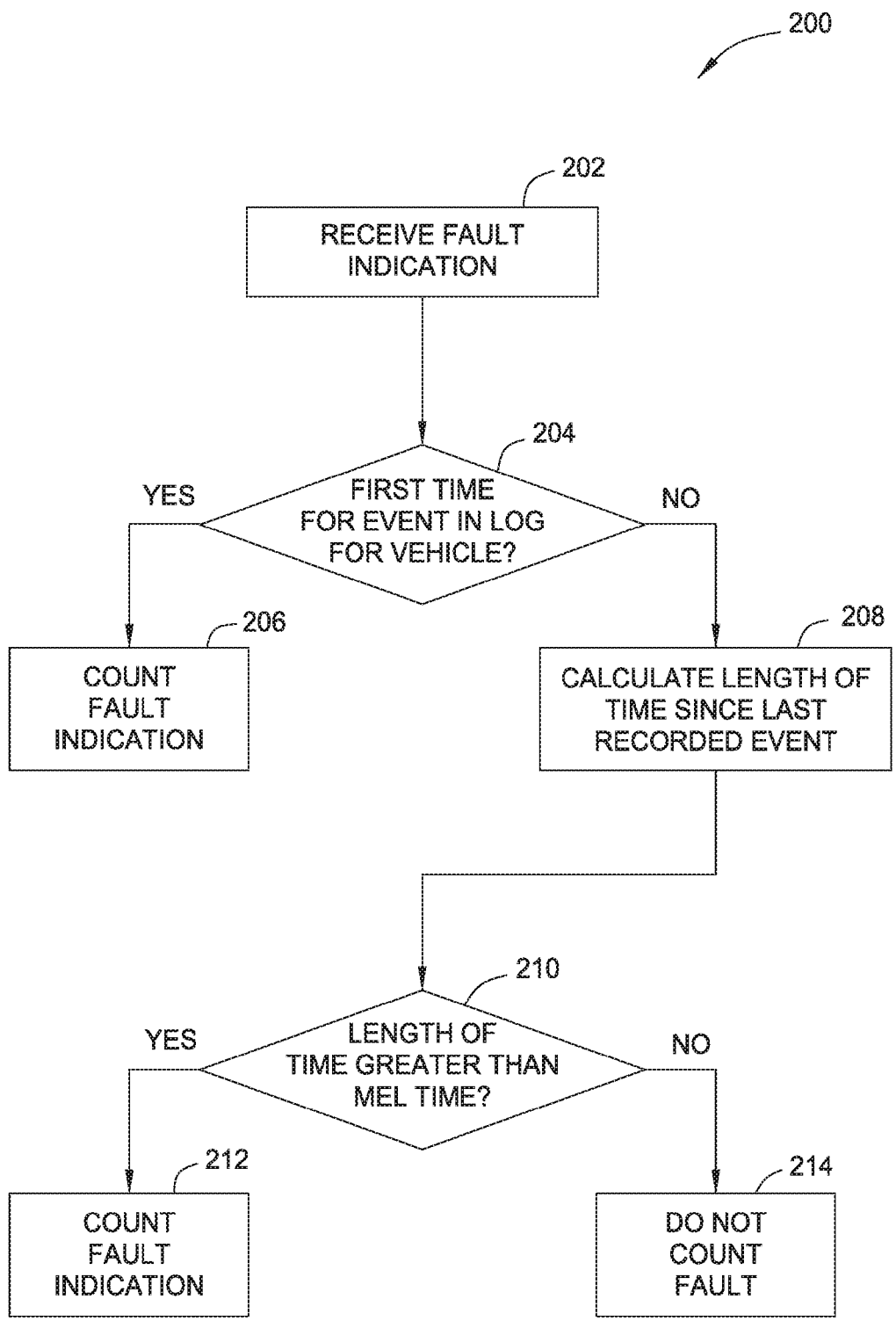
FIG. 2 is a flow chart according to at least one aspect for determining whether to count a fault event indication or ignore a fault event indication.

FIG. 2 illustrates a process 200 for identifying duplicate fault event indications so that they are not used in calculating a probability of a service interruption. In block 202, a fault event indication is received from an aircraft. In block 204, a determination is made whether the fault event indication is a first instance of the fault event indication for the particular aircraft. If the fault event indication is a first instance, then the fault event indication is counted in block 206. Returning to block 204, if the fault event indication is not a first instance for the particular vehicle, then a length of time since the last fault event indication is calculated in block 208. In block 210, the length of time since the last fault event indication calculated in block 208 is compared to a time limit to address the fault event. For example, an aircraft operator may be provided a time period of ten days after a fault event occurs to address the fault. The time limit may be provided by a regulatory agency, such as the Federal Aviation Administration (FAA), for example. As discussed above, if a second fault event indication occurs within the provided time period of a first fault event indication, then the second fault event indication is likely a duplicate fault event indication, and the second fault event indication is not counted, as indicated by block 214. If the second fault event indication occurs outside of the provided time period of the first fault event indication, then the second fault event indication is likely associated with a new instance of the fault because it is assumed that the fault event that caused the first fault event indication was corrected within the provided time period. As a result, when the second fault event indication occurs outside of the provided time period of the first fault event, the second fault event indication is counted, as indicated by block 212.

In the event that a fault event indication is counted in block 206 or in block 212, the counted fault event indication and an associated service interruption, if applicable, are added to totals of past fault event indications and associated service interruptions, respectively. The totals of past fault event indications and associated service interruptions could be specific to a single aircraft, to all the aircraft of a particular type operated by a particular operator, or for all aircraft of the particular type across all operators, for example. In various instances, the fault event and fault event indication are specific to a particular component onboard the aircraft, such as a hydraulic pump. The hydraulic pump could be used on different aircraft types. In such instances, the totals of past fault event indications and associated service interruptions could be specific to the different types of aircraft using the exemplary hydraulic pump. After the totals of past fault event indications and associated service interruptions have been updated to include the counted fault event indication (from block 206 or block 212), the probability of a schedule interruption is calculated according to equation (1), above.

As an example, assume that before performing the process 200, a particular fault event indication has been counted twelve times for a particular type of aircraft and that three of the twelve counted fault event indications resulted in a service interruption. The calculated probability of a service interruption would be $3/12$ or 0.25 or 25%. Suppose that a new fault event indication occurs and is counted, according to the process 200, described above, but the new fault event indication does not result in a service interruption. In such an exemplary scenario, the total number of fault event indications is incrementally increased from twelve to thirteen and the total number of service interruptions remains the same at three. The calculated probability of a service interruption would change to $3/13$ or 0.23 or 23%. Now, suppose that another new fault event indication occurs (e.g., on a different aircraft) and is counted, according to the process 200, and the new fault event indication results in a service interruption. In such an exemplary scenario, the total number of fault event indications is incrementally increased again from thirteen to fourteen and the total number of service interruptions is incrementally increased from three to four. The calculated probability of a service interruption would change to $4/14$ or 0.28 or 28%.

The process for determining a countable fault event indication and for calculating the probability of a service interruption could be performed in a delayed manner in at least one aspect. Put differently, a fault event indication may be received from an aircraft almost immediately. However, it may take some time to determine whether the fault event indication resulted in a service interruption. For example, the operator of an aircraft may output daily, weekly, or monthly reports that detail service interruptions. As a result, calculating the probability of a service interruption may not be performed concurrently with the received fault event indication.

Figure 3:
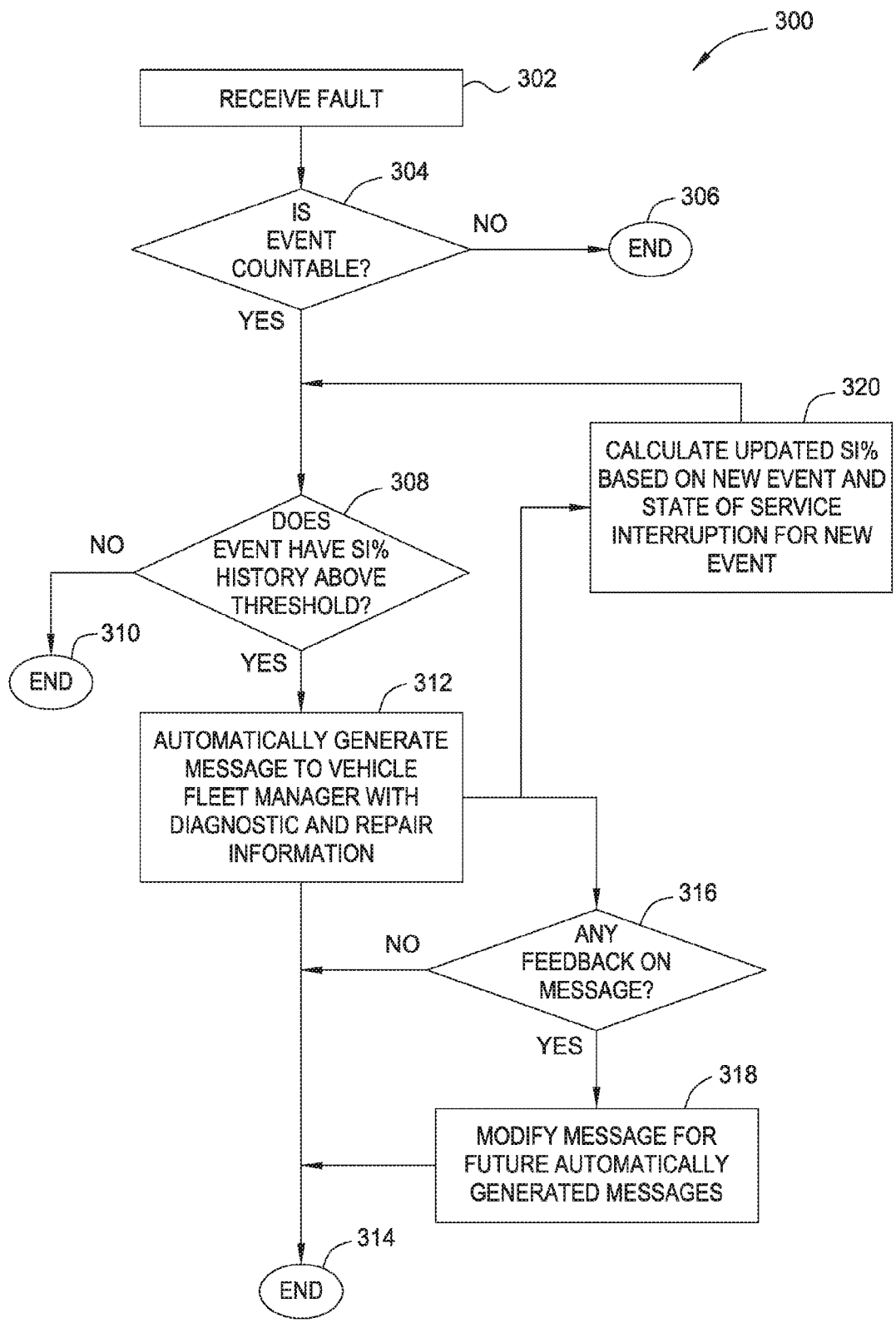
FIG. 3 is a flow chart according to at least one aspect for determining whether a fault event indication is associated with a probability of a service interruption that exceeds a threshold level and automatically generating a message related to the fault event indication if the associated probability exceeds the threshold level.

FIG. 3 illustrates a process 300 for automatically generating messages related to fault events. In block 302, a new fault event indication is received. In block 304, the process 300 determines whether the event is countable. For example, the process 200 could be implemented in block 304 to determine whether the new fault event indication is countable. For example, if a particular aircraft is permissibly operating with a fault (e.g., within the allowed period of time), then the aircraft may be repeatedly outputting the same fault event indication with every flight. Only the first fault event indication would be countable. If the fault event indication is not countable, then the process ends at block 306. Returning to block 304, if the event is countable, then the process 300 moves to block 308 to determine whether the fault event indication is associated with a probability of causing a service interruption above a threshold percentage. Here, the new fault event indication is compared to the probability calculated based on historical occurrences of the fault event indication and service interruptions. The threshold could be determined based on operator preferences or other criteria. For example, an aircraft operator may want to receive messages for fault event indications that have a 5% or higher probability of causing a service interruption. In the event the new fault event indication is associated with a probability of a service interruption below the predetermined threshold level, the process 300 ends at block 310. In the event the new fault event indication is associated with a probability of a service interruption above the predetermined threshold level, the process 300 automatically generates and sends a message to the aircraft operator in block 312, discussed in greater detail below with reference to FIG. 5. The message generated in block 312 can include diagnostic information, repair information, and workaround information related to the underlying fault event for the fault event indication. A fleet manager, maintenance provider, or other person could use the information in the message to quickly address the fault event and return the aircraft to service with a reduced service interruption or no service interruption. After the message has been automatically generated and sent in block 312, the process 300 can end at block 314.

The process 300 can include optional additional steps in various aspects. In some instances, the operator of the aircraft could provide feedback on the message that was automatically generated and sent in block 312. For example, the operator may indicate that certain provided information was not particularly helpful and that other information would have been helpful if it had been included. In block 316, after the message is generated and sent, the process 300 can determine whether feedback on the message is received from the operator. If no feedback is provided, then the process 300 can end at block 314. If feedback is provided, then the formatting of the message can be modified at block 318 to incorporate the received feedback for future messages. For example, additional information requested by the operator could be added to future messages.

The process 300 could also update the calculated probability of a service interruption based on the new fault event indication received at block 302. In block 320, the process 300 could add the new fault event indication to the total number of instances of that fault event. As discussed above, the total could be for the particular aircraft or for the type of the aircraft, for example. Later, after the operator indicates whether a service interruption was associated with the fault event indication, the probability of a service interruption that includes the new fault event indication and any service interruption can be calculated.

Figure 4:
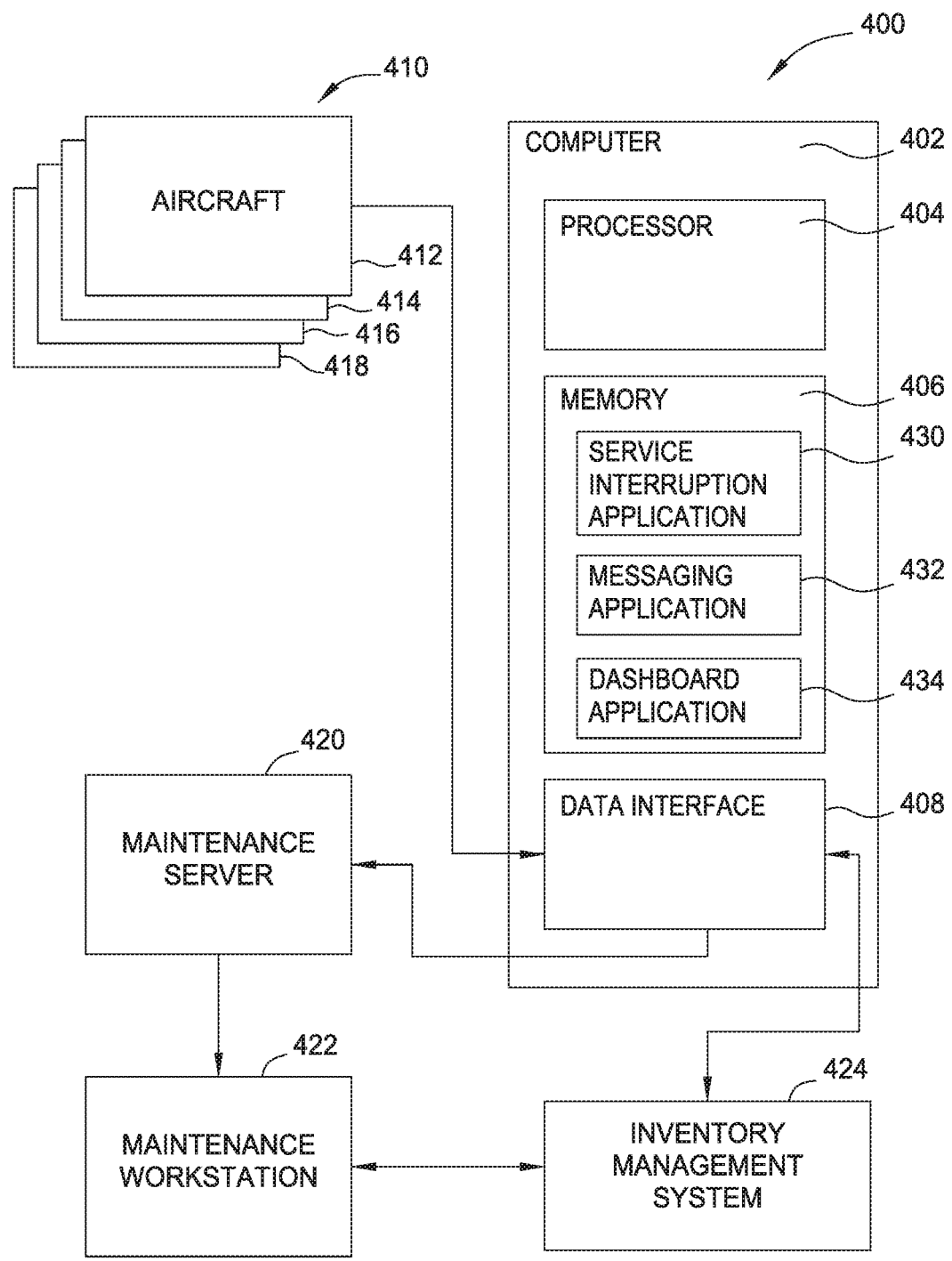
FIG. 4 is a block diagram of a system for determining whether to count a fault event indication or ignore a fault event indication and for determining whether a fault event indication is associated with a probability of a service interruption that exceeds a threshold level and automatically generating a message related to the fault event indication if the associated probability exceeds the threshold level.

FIG. 4 illustrates a system 400 according to at least one aspect for calculating probabilities of service interruptions associated with different fault event indications and for outputting messages related to fault event indications in the event that a particular fault event indication is associated with the probability of the service interruption above a predetermined threshold level. The system 400 includes a computer 402 that has a processor 404 and memory 406. The memory 406 can store a service interruption application 430 that, when executed on the processor 404, filters out duplicate fault event indications and calculates probabilities of service interruptions for fault event indications. The memory 406 can also store a messaging application 432 that generates and transmits messages related to received fault event indications that are associated with probabilities of service interruptions above a threshold amount, discussed in greater detail below with reference to FIG. 5. The memory 406 can also store a dashboard application 434 that generates and transmits dashboard entries for fault event indications that occur within a fleet of aircraft, discussed in greater detail below with reference to FIG. 6. The memory 406 can also store fault event indication data and service interruption data used to filter duplicate fault event indications and/or to calculate the probabilities of service interruptions for the various fault event indications. The memory 406 can also store a data structure that includes message content for messages related to fault events, discussed in greater detail below. The computer 402 also includes a data interface 408 that can communicate with outside systems. For example, the data interface 408 could be an Ethernet connection that connects to the Internet or another computer network.

The data interface 408 can receive fault event indications from one or more aircraft. For example, in the context of commercial aircraft 410, the data interface 408 could receive fault event indications from a single aircraft 412 or from a plurality of aircraft 412, 414, 416, and 418. The plurality of aircraft could all be of the same type of aircraft (e.g., Boeing 737-800). For example, fault event data could be accumulated across the entire fleet of the same type of aircraft. For example, one system on board an aircraft could include a temperature sensor that monitors brake temperature for the fourth wheel of the left main landing gear on board a particular type of aircraft. The system could output a fault event indication in the event the monitored brake temperature exceeds a threshold temperature, thereby providing an early indication that brake components should be maintained and/or replaced soon. The number of fault event indications and service interruptions associated with the fault event indications for the monitored brake temperature for the fourth wheel of the left main landing gear of the type of aircraft could be accumulated from all of the aircraft in a particular operator's fleet to calculate an overall probability of a service interruption for the fault event indication for that fleet. In various aspects, the plurality of aircraft could be different types of aircraft. For example, in the context of commercial airline, the plurality of vehicles could include the entirety of the fleet of aircraft operated by the airline, which could include different manufacturers. In such aspects, the data received at the data interface 408 from the vehicles 410 could be parsed such that the probabilities of service interruptions for various fault event indications for each vehicle type are calculated separately.

In various aspects, certain systems may be common across multiple types of aircraft. As a hypothetical example, a first aircraft type and a second aircraft type could use the same hydraulic pump. In such a hypothetical scenario, instances of fault event indications and service interruptions related to the hydraulic pump for the first aircraft type and the second aircraft type could be grouped together to calculate a probability of the service interruption related to a fault event indications of the hydraulic pump. Continuing the hypothetical example, a third aircraft type may also use the same hydraulic pump as is used on the first aircraft type and the second aircraft type. However, the third aircraft type may typically operate in a different manner (flying shorter legs) then the first aircraft type and the second aircraft type (flying long distance legs). As a result, the duty cycle on the hydraulic pump for the third aircraft type may look very different than the duty cycle for the same hydraulic pump on the first aircraft type and the second aircraft type. Thus, instances of fault event indications and service interruptions for the hydraulic pump for the third aircraft type may not be combined with the instances of fault event indications and service interruptions for the first aircraft type and the second aircraft type.

The aircraft 410 can individually transmit to the data interface 408 various information when a fault event indication occurs. For example, if a fault event indication occurs on the aircraft 412, the aircraft 412 could transmit a digital word or other code associated with the fault event indication. For example, a fault event indication associated with a high brake temperature at the #1 wheel of the left main landing gear for a particular aircraft type may be associated with the digital word "00000010" and a high brake temperature at the #2 wheel of the left main landing gear for a particular aircraft type may be associated with the digital word "00000011." The aircraft 412 could transmit additional information to the data interface 408, such as a tail number or manufacturer serial number of the aircraft 412 and a date and time of the fault event indication.

Upon receiving fault event indication information from the aircraft 412, the service interruption application 430 executing on the processor 404 could store the fault event indication information in computer memory 406. The service interruption application 430 executing on the processor 404 could then perform the processes 200 and 300, discussed above, to determine whether the fault event indication should be counted and whether the fault event indication is associated with a probability of a service interruption above a predetermined threshold level. In the event the service interruption application 430 determines that a received fault event indication is associated with a probability of a service interruption above the predetermined threshold level, the messaging application 432 executing on the processor 404 transmits to a maintenance server 420 for the operator of the aircraft 412 a message related to the fault event indication, discussed in greater detail below with reference to FIG. 5.

At a later time after the fault event indication information is transmitted, the maintenance server 420 could send a message to the system 400 via the data interface to indicate whether the fault event indication transmitted by the aircraft 412 resulted in a service interruption. At this time, the service interruption application 430 executing on the processor 404 could then perform the process 200, discussed above, to determine whether the fault event indication should be counted and calculate the probability of a service interruption for the fault event indication, discussed above.

The data interface 408 can also be in communication with an inventory management system 424. As discussed in greater detail below, the messaging application 432 executing on the processor 404 can output a message to the operator of the aircraft 410 that can provide instructions for addressing a fault event indication. The message could include a list of parts that are used to address a particular fault event indication. The data interface 408 can communicate with the inventory management system 424 to retrieve information related to parts availability.

The data interface 408 can also be in communication with a maintenance server 420 operated by the operator of the machine (e.g., the vehicles 410). As discussed in greater detail below, the messaging application 432 executing on the processor 404 can send a message to provide information about the fault event associated with the fault event indication. Upon receiving a message, the maintenance server 420 could output the message to a maintenance work station 422 (e.g., a computer used by maintenance personnel for the vehicles 410. The message could include links that the maintenance work station 422 can use to access the inventory management system 424 to order parts to address the fault event associated with the fault event indication, discussed in greater detail below.

For the sake of simplicity, FIG. 4 shows the data interface 408 in direct communication with the aircraft 410, the maintenance server 420, and the inventory management system 424. In various instances, the communication could be performed over a computer network, such as over the Internet. Additional systems could also be implemented to facilitate communication amongst the above-described components. For example, the aircraft 410 may communicate with a data server and the data server could communicate the fault event indication information to the data interface 408.

Figure 5:
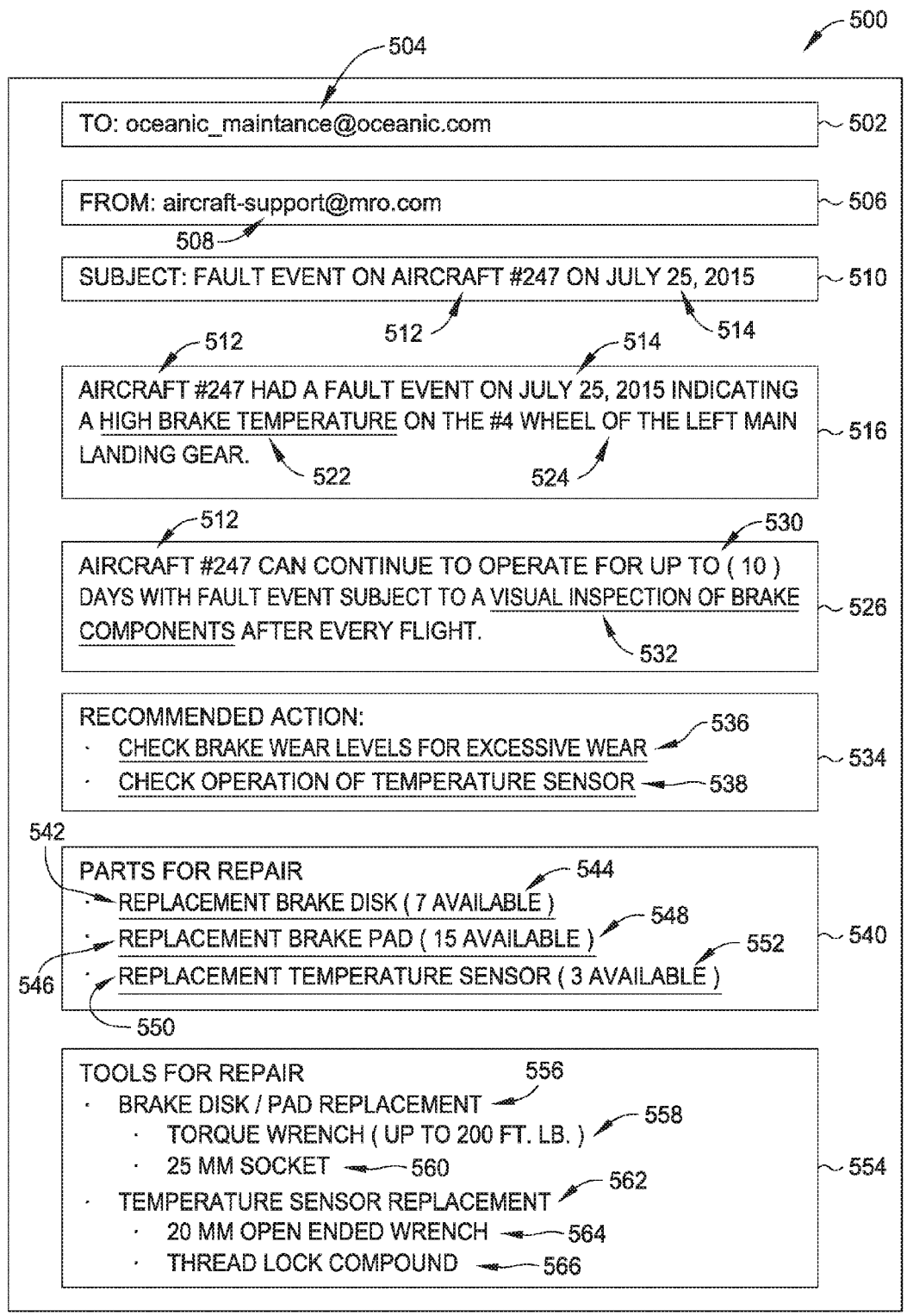
FIG. 5 is an exemplary e-mail message that has been automatically generated in response to a received fault event indication that is associated with a probability of a service interruption that exceeds a threshold level.

FIG. 5 illustrates an exemplary message 500 that can be generated and transmitted to the maintenance server 420 via the data interface 408, shown in FIG. 4, by the messaging application 432 executing on the processor 404. For example, the message 500 could be an electronic mail (e-mail) message that can be sent to the maintenance server 420. When the service interruption application 430 executing on the processor 404 receives a counted fault event indication from one of aircraft 410 that has a probability of service interruption above a threshold amount, the messaging application 432 executing on the processor 404 can automatically generate the message 500. For example, the messaging application 432 executing on the processor 404 could automatically open and/or access an e-mail program, such as Microsoft outlook, and create a new e-mail message. The messaging application 432 executing on the processor 404 then automatically fills in fields of the e-mail message 500. For example, the messaging application 432 executing on the processor 404 could automatically add an e-mail address 504 in a "To:" field 502 in the message 500. For example, as discussed above, the received fault event indication information could include an identification of the aircraft. The memory 406 of the system 400 could store a data structure that includes a look-up table that identifies the operators for various aircraft. The look-up table (or a different look-up table) could include designated e-mail addresses to which messages should be sent for the various aircraft and/or for the various aircraft operators. For example, an airline could designate a single e-mail address for all e-mail messages 500. As another example, an airline could designate different e-mail addresses for e-mail messages 500 related to different types of aircraft or different types of fault events. For example, an airline could designate a first email address that is used by a maintenance manager for a first type of aircraft for e-mail messages 500 related to fault event indications for the first aircraft type. The airline could also designate a second e-mail address that is used by a maintenance manager for a second type of aircraft for e-mail messages 500 related to fault event indications for the second aircraft type. The messaging application 432 executing on the processor 404 could access the data structure and identify the operator and the designated e-mail address. The messaging application 432 executing on the processor 404 could then insert the designated e-mail address from the look-up table into the "To:" field 502 of the e-mail message 500.

The messaging application 432 executing on the processor 404 could also automatically add an e-mail address 508 in the "From:" field 506. An e-mail address 508 provided in the "From:" field 506 could be a standard e-mail address associated with an account of the e-mail program or could be custom entered.

The messaging application 432 executing on the processor 404 can also automatically add a subject line in a "Subject" field 510. The subject field 510 is dynamically generated to include an aircraft designation 512 that identifies the particular aircraft that output the fault event indication and a date designation 514 that identifies the date of the fault event indication. In various aspects, the subject field 510 could also include identification of the particular fault event indication that was output and/or the exact time that the fault event indication was output, for example.

The messaging application 432 executing on the processor 404 could also automatically generate and format various fields to include in the body of the message 500. For example, a first field 516 could include a message that identifies the nature of the fault event indication. In the exemplary message 500 depicted in FIG. 5, the first field 516 includes a message that states "aircraft #247 had a fault event on Jul. 25, 2015 indicating a high break temperature on the number four wheel of the left main landing gear." The message includes dynamically-inserted information including the aircraft designation 512 identifying aircraft #247 and the date designation 514 identifying the date of the fault event indication. For example, the messaging application 432 executing on the processor 404 receives the aircraft designation 512 and the date designation 514 from the aircraft when the fault event indication from the aircraft is received via the data interface 408 and can insert this information into the message in the first field 516. The message also includes dynamically-inserted information that identifies the nature of the fault event indication. In this case, the nature of the fault event indication is a high temperature on the number four wheel of the left main landing gear. The described nature of the fault event indication includes a fault designation 522 (e.g., a high brake temperature) and a location designation 524 of the fault event (e.g., #4 wheel of the left main landing gear). Here, the messaging application 432 executing on the processor 404 could search a lookup table or another data structure in the memory 406 that stores associations between fault event indications that can be sent by the aircraft and text descriptions of the fault event indicated by the fault event indication. The messaging application 432 executing on the processor 404 can then dynamically insert the text description(s) into the first field 516 to provide the fault designation 522 and the location designation 524. In various aspects, the message could include a hyperlink that a reader of the message 500 can select to get more information about the fault event. For example, the fault designation 522 includes a hyperlink (e.g., indicated by underlining) that maintenance personnel or others could select. Selecting the hyperlink opens a web browser, such as Internet Explorer, Firefox, or Chrome and/or opens a web page that explains in greater detail what the high brake temperature means and what problems could be caused by the high brake temperature, for example.

The e-mail includes a second field 526 that provides information related to short-term workarounds for the fault event. In the exemplary message 500 depicted in FIG. 5, the second field 526 includes a message that states "Aircraft #247 can continue to operate for up to ten (10) days with fault event subjection to a visual inspection of brake components after every flight." The message includes dynamically-inserted information including the aircraft designation 512, an allowed period of time 530 the aircraft can be operated before addressing the fault event, and a designated short-term process 532 required before the fault event is addressed. Here, the messaging application 432 executing on the processor 404 could search a lookup table or another data structure in the memory 406 that stores associations between fault event indications that can be sent by the aircraft and text descriptions of the designated short-term process(es) associated with the fault event indications. The messaging application 432 executing on the processor 404 can then dynamically insert the text description(s) into the second field 526 to provide the designated short-term process 532. In various aspects, the designated short-term process 532 could include a hyperlink (e.g., indicated by underlining) that maintenance personnel or others could select. Selecting the hyperlink opens a web browser, such as Internet Explorer, Firefox, or Chrome and/or opens a web page that provides greater detail related to conducting the designated short-term process (e.g., the visual inspection of brake components mentioned in the message 500).

The exemplary message 500 includes a third field 534 that provides information related to steps to address the fault event. In the exemplary message 500 depicted in FIG. 5, the third field 534 includes two actions: "Check brake wear levels for excessive wear" 536 and "Check operation of temperature sensor" 538. The actions can be dynamically inserted into the third field 534. Here, the messaging application 432 executing on the processor 404 could search a lookup table or another data structure in the memory 406 that stores associations between fault event indications that can be sent by the aircraft and text descriptions of the actions to address the faults. The messaging application 432 executing on the processor 404 can then dynamically insert the text description(s) into the third field 534 to provide the actions to address the fault event indicated by the fault event indication. In various aspects, the actions 536 and 538 could include hyperlinks (e.g., indicated by underlining) that maintenance personnel or others could select. Selecting the hyperlink opens a web browser, such as Internet Explorer, Firefox, or Chrome and/or opens a web page that provides greater detail related to the actions to address the fault event indication.

The exemplary message 500 includes a fourth field 540 that provides information related to parts to perform the corrected actions listed in the third field 534 and availability of the parts. In the exemplary message 500 depicted in FIG. 5, the fourth field includes three parts in a list: a "replacement brake disk" 542, a "replacement brake pad" 546, and a "replacement temperature sensor" 550. The list of parts can be dynamically inserted into the fourth field 540. For example, the messaging application 432 executing on the processor 404 could search a lookup table or another data structure in the memory 406 that stores associations between the recommended actions in 536 and 538 in the third field 534 and parts that could be replaced in the performance of the recommended actions. The messaging application 432 executing on the processor 404 can then dynamically insert text descriptions for the parts into the fourth field 540. In various aspects, the processor 404 can communicate with the inventory management system 424 to retrieve part availability information for the parts in the list and dynamically insert the information into the fourth field 540 of the message 500. The fourth field 540 of the exemplary message 500 includes part availability information for the parts in the list. In the exemplary message 500, the fourth field 540 includes a first numerical indicator 544 that indicates that there are seven available replacement brake disks 542, a second numerical indicator 548 that indicates that there are fifteen available replacement brake pads 546, and a third numerical indicator 552 that indicates that there are three available replacement temperature sensors 550. To generate the list, the messaging application 432 executing on the processor 404 can query the inventory management system 424 for number of parts in inventory for the different parts listed in the fourth field 540. The inventory management system 424, in response to the query, can send to the messaging application 432 executing on the processor 404 the numbers of parts in inventory for the respective parts listed in the fourth field 540. In various aspects, the messaging application 432 executing on the processor 404 could send the query when the message 500 is being generated and populate the message 500 with the numbers returned by the inventory management system 424.

In various aspects, the messaging application 432 executing on the processor 404 could populate the numerical indicators in the fourth field 540 with dynamic scripts that automatically download updated inventory information every time the message 500 is accessed. Whenever the message 500 is viewed (e.g., opened by a recipient on a maintenance workstation 422), the dynamic scripts automatically query or re-query the inventory management system 424 to obtain up-to-date inventory information. For example, if a recipient opens the message 500 a first time, the dynamic scripts in the message 500 could dynamically retrieve current inventory levels from the inventory management system 424 and populate the numerical indicators in the fourth field 540 with the current inventory levels. If the recipient later opens the message 500 a second time, the dynamic links in the message 500 could dynamically retrieve updated current inventory levels from the inventory management system 424 and populate the numerical indicators in the fourth field 540 with the updated current inventory levels.

In various aspects, the listed parts 542, 546, and 550 could include hyperlinks (e.g., indicated by underlining) that maintenance personnel or others could select. Selecting the hyperlink opens a web browser, such as Internet Explorer, Firefox, or Chrome and/or opens a web page that accesses an ordering page so that a recipient can order the respective parts from the inventory management system 424, for example.

The exemplary message 500 includes a fifth field 554 that provides information related to tools to perform the corrected actions listed in the third field 534. The list of tools can be dynamically inserted into the fifth field 554. For example, the messaging application 432 executing on the processor 404 could dynamically generate a first subheading 556 in the fifth field 554 for tools to replace the brake disks and brake pads. The messaging application 432 executing on the processor 404 can access a lookup table or other suitable data structure that identifies tools necessary to replace the brake disks and/or brake pads and populate a list beneath the first subheading 556 with the tools. In the exemplary message 500, the messaging application 432 executing on the processor 404 has populated the list with a torque wrench rated up to two hundred foot pounds of torque 558 and a twenty five millimeter socket 560. The computer processor 404 could also dynamically generate a second subheading 562 in the fifth field 554 for tools to replace the temperature sensor. The messaging application 432 executing on the processor 404 can access the lookup table or other suitable data structure that identifies tools necessary to replace the temperature sensor and populate a list beneath the second subheading 562 with the tools. In the exemplary message 500, the computer processor 404 has populated the list with a twenty millimeter open ended wrench 564 and a thread lock compound 566.

The messaging application 432 executing on the processor 404 can transmit the automatically generated message 500 to the maintenance server 420 and/or the maintenance workstation 422 of the operator of the aircraft 412. By automatically generating and transmitting the message 500 for fault event indications associated with high probabilities of service interruptions, the aircraft operator can rapidly take action to avoid a service interruption or reduce the length of time of such a service interruption.

In various circumstances, an aircraft operator, an aircraft manufacturer, and/or an aircraft maintenance operation may track fault event indications across a fleet of aircraft. For example, an aircraft manufacturer and/or an aircraft maintenance operation may operate a support center that can work with maintenance personnel for the aircraft operator to resolve fault events. In various circumstances, such as support center could include an interface used by personnel in the support center to track fault event indications occurring in the fleet of aircraft. FIG. 6 illustrates a "dashboard" 600 interface that illustrates fault events being reported by a fleet of vehicles. The dashboard 600 interface includes dashboard entries arranged as rows of data related to fault event indications received for different fault event indications. In the exemplary dashboard 600 depicted in FIG. 6, there are three dashboard entries (i.e., rows of information) shown for three different fault event indications. Each row includes different fields of information in columns. A first column 602 indicates an aircraft serial number. In various aspects, the first column 602 could indicate a tail number or other identifier for an aircraft. A second column 604 indicates the fault event indication output by the particular aircraft. A third column 608 indicates a date and time for when the fault event indication was output by the aircraft. A fourth column 610 indicates the probability of a service interruption resulting from the fault event indication. A fifth column 612 indicates whether a fault event message (e.g., the message 500 discussed above with reference to FIG. 5) has been sent. In various aspects, additional columns for other fields could be included in addition to or in place of the above-described fields.

A first dashboard entry (row 614) of the dashboard 600 is for aircraft serial number 13478, and the fault event indication is a #4 wheel high brake temperature that occurred on Sep. 3, 2015 at 10:47 AM. In this exemplary scenario depicted in FIG. 6, the number four wheel high brake temperature fault event indication corresponds to a probability of the service interruption of 7%. The dashboard 600 indicates that a fault event message (e.g., the message 500 shown in FIG. 5) was sent at 10:55 AM on Sep. 3, 2015. In various aspects, could simply indicate yes or no.

A second dashboard entry (row 616) of the dashboard 600 is for aircraft serial number 27450, and the fault event indication is a #4 wheel high brake temperature that occurred on Sep. 4, 2015 at 11:53 PM. In this exemplary scenario, aircraft serial number 27450 may be of the same type as aircraft serial number 13478. Therefore, the probability of a service interruption for the number four wheel high brake temperature for aircraft serial number 27450 is the same as the probability of a service interruption for the same fault event for aircraft serial number 13478. The dashboard 600 indicates that a fault event message has not been sent yet (as indicated by the "N") but that an expected time for such a message to be sent is five minutes.

A third dashboard entry (row 618) of the dashboard 600 is for aircraft serial number 04771, in the fault event indication is a #1 landing light being burnt out or otherwise inoperative. The fault event indication occurred at 11:55 PM on Sep. 4, 2015. In this exemplary scenario, the number one landing light being inoperative corresponds to a probability of a service interruption of 1%. As discussed above, in various aspects, a probability of a service interruption of 1% may be below a predetermined threshold level and a fault event message is therefore not automatically sent. The dashboard 600 indicates that no message is to be sent by including "N/A" in the message sent field.

Referring again to FIG. 4, the dashboard application 434 could execute on the processor 404 to populate the various fields 602, 604, 608, 610, and 612 for a fault event indication entry on the dashboard 600. For example, the dashboard application 434 could extract information from fault event indication sent by an aircraft (e.g., one of the vehicles 410) to populate the aircraft serial number field 602, the fault event indication field 604 and the time of fault event indication field 608. The dashboard application 434 could query the service interruption application 430 and/or the fault event indication information stored in computer memory 406 to populate the probability of service interruption field 610. The dashboard application 434 can query the messaging application 432 to determine whether a fault event message has been and populate the fault event message sent field 612. In various aspects, the dashboard 600 could include color coding for the various rows to indicate a status of a particular fault event indication. For example, the row 616, relating to a fault event indication with a high probability of a service interruption where no fault event message has been sent, could be shaded red. The row 614, relating to a fault event indication with a high probability of the service interruption where the fault event message has been sent could be shaded yellow. Rows of the dashboard 600 related to fault event messages with a low probability of service interruption (e.g., below a threshold probability) and/or rows of the dashboard 600 related to fault event indications that have been addressed or mitigated could be shaded green.

The dashboard application 434 could output the dashboard 600 via the data interface 408 to a computer display screen. For example, the dashboard application 434 could transmit the dashboard 602 the maintenance server 420 and/or to the maintenance work station 422 for display on a computer display screen. The dashboard 600 can provide a maintenance support call center with near real-time information related to fault event indications occurring within a fleet of aircraft.

The aspects discussed above have been explained in the context of commercial aircraft. Aspects described herein could be used with other types of vehicles, such as commercial trucks, busses, trains, ships, and construction vehicles. Aspects described herein could be used with other machinery, such as manufacturing tooling and heating, ventilation, and air conditioning systems in commercial buildings.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects disclosed herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of aspects described herein, a user may access applications (e.g., an application to calculate a probability of a service interruption or an application to automatically generate and transmit a message responsive to a fault event indication) or related data available in the cloud. For example, the application to calculate the probability of a service interruption for a fault event indication could execute on a computing system in the cloud and output a probability of a service interruption based on the processes described herein. In such a case, the application to calculate the probability of a service interruption could receive fault event indication data and service interruption data, filter the fault event indication data to remove duplicate indications, and calculate a probability of a service interruption for the fault event indication. The application could and store the calculated probability of a service interruption for the fault event indication at a storage location in the cloud. Doing so allows a user to access this information from any computing system attached to a network connected to the cloud (e.g., the Internet).

While the foregoing is directed to aspects described herein, other and further aspects may be devised without departing from the basic scope thereof, and the scope thereof is determined by the claims that follow.

What is claimed is:
1. A computer-implemented method, comprising:
receiving a fault event indication signal from a sensor on a vehicle;
determining, using a computer processor, an amount of time that has elapsed since the vehicle previously output the fault event indication;
determining a fault event resolution time period for the received fault event indication;
including the fault event indication in a total number of instances of the fault event indication only if the determined amount of time is greater than the determined fault event resolution time period for the received fault event indication;
upon receiving an indication that a service interruption occurred as a result of the fault event indication, including the service interruption in a total number of instances of service interruptions that occurred as a result of the fault event indication;
calculating, using a computer processor, a probability of a service interruption for the fault event for the vehicle based on the total number of instances of the fault event indication for the vehicle and the total number of instances of service interruptions for the fault event for the vehicle; and
outputting, using a computer processor, the calculated probability of a service interruption for the fault event to a messaging application, wherein the messaging application is executable by at least one computer processor to generate and transmit fault event messages upon the calculated probability of a service interruption for the fault event exceeding a predetermined threshold level.

2. The computer-implemented method of claim 1, further comprising:
upon the calculated probability of a service interruption exceeding a predetermined threshold level, executing the messaging application to:
automatically generate a fault event message; and
transmit the fault event message addressed to a maintenance server.

3. The computer-implemented method of claim 2, wherein automatically generating the fault event message comprises:
creating an electronic mail (e-mail) message;
addressing the e-mail to a designated e-mail address of the operator;
formatting a body of the e-mail to include a plurality of fields of information related to the fault event; and
automatically transmitting the e-mail.

4. The computer-implemented method of claim 3, wherein the information related to the fault event includes at least one of:
an identification of the fault event;
a hyperlink that directs a computer to maintenance instructions to correct the fault event;
a list of parts for maintenance to correct the fault event;
availability of parts;
a hyperlink that directs a computer to a computer system for ordering one or more parts from the list of parts; and
temporary solutions to operate the vehicle with the fault event.

5. The computer-implemented method of claim 1, wherein the vehicle is an aircraft.

6. The computer-implemented method of claim 1, wherein the vehicle is a fleet of similar vehicles, wherein the total number of instances of the fault event indication for the vehicle includes a total number of instances of the fault event for the fleet of vehicles, and wherein the total number of instances of service interruptions for the fault event for the vehicle includes the total number of service interruptions for the fault event for the fleet of vehicles.

7. The computer-implemented method of claim 1, wherein the calculated probability of a service interruption for the fault event is proportional to the total number of instances of the fault event for the vehicle divided by the total number of instances of service interruptions for the fault event for the vehicle.

8. The computer-implemented method of claim 1, wherein the sensor comprises a plurality of sensors, wherein each of the plurality of sensors is operable to detect a different fault and output a different fault event indication.

9. A system, comprising:
a computer processor; and
a computer memory containing a program that, when executed on the computer processor, performs an operation for processing data, comprising:
receiving a fault event indication signal from a sensor on a vehicle;
determining an amount of time that has elapsed since the vehicle previously output the fault event indication;
determining a fault event resolution time period for the received fault event indication;
including the fault event indication in a total number of instances of the fault event indication only if the determined amount of time is greater than the determined fault event resolution time period for the received fault event indication;
upon receiving an indication that a service interruption occurred as a result of the fault event indication, including the service interruption in a total number of instances of service interruptions that occurred as a result of the fault event indication;
calculating the probability of a service interruption for the fault event for the vehicle based on the total number of instances of the fault event for the vehicle and the total number of instances of service interruptions for the fault event for the vehicle; and
outputting the calculated probability of a service interruption for the fault event to a messaging application, wherein the messaging application is executable by at least one computer processor to generate and transmit fault event messages upon the calculated probability of a service interruption for the fault event exceeding a predetermined threshold level.

10. The system of claim 9, wherein the messaging application performs an additional operation for processing data, comprising:
upon the calculated probability of a service interruption exceeding a predetermined threshold level:
automatically generating a fault event message; and
transmitting the fault event message addressed to a maintenance server.

11. The system of claim 10, wherein automatically generating the fault event message comprises:
creating an electronic mail (e-mail) message;
addressing the e-mail to a designated e-mail address of the operator;
formatting a body of the e-mail to include a plurality of fields of information related to the fault event; and
automatically transmitting the e-mail.

12. The system of claim 11, wherein the information related to the fault event includes at least one of:
an identification of the fault event;
a hyperlink that directs a computer to maintenance instructions to correct the fault event;
a list of parts for maintenance to correct the fault event;
availability of parts;
a hyperlink that directs a computer to a computer system for ordering one or more parts from the list of parts; and
temporary solutions to operate the vehicle with the fault event.

13. The system of claim 9, wherein the vehicle is a fleet of similar vehicles, wherein the total number of instances of the fault event for the vehicle includes a total number of instances of the fault event for the fleet of vehicles, and wherein the total number of instances of service interruptions for the fault event for the vehicle includes the total number of service interruptions for the fault event for the fleet of vehicles.

14. The system of claim 9, wherein the calculated probability of a service interruption for the fault event is proportional to the total number of instances of the fault event for the vehicle divided by the total number of instances of service interruptions for the fault event for the vehicle.

15. A computer program product, comprising:
a computer-readable storage medium having computer-readable program code embodied therewith, the computer-readable program code executable by one or more computer processors to:
receive a fault event indication signal from a sensor on a vehicle;
determine an amount of time that has elapsed since the vehicle previously output the fault event indication;
determine a fault event resolution time period for the received fault event indication;
include the fault event indication in a total number of instances of the fault event indication only if the determined amount of time is greater than the determined fault event resolution time period for the received fault event indication;
upon receiving an indication that a service interruption occurred as a result of the fault event indication, include the service interruption in a total number of instances of service interruptions that occurred as a result of the fault event indication;
calculate the probability of a service interruption for the fault event for the vehicle based on the total number of instances of the fault event for the vehicle and a total number of instances of service interruptions for the fault event for the vehicle; and
output the calculated probability of a service interruption for the fault event to a messaging application, wherein the messaging application is executable by at least one computer processor to generate and transmit fault event messages upon the calculated probability of a service interruption for the fault event exceeding a predetermined threshold level.

16. The computer program product of claim 15, wherein the computer-readable program code is further executable to:
upon the calculated probability of a service interruption exceeding a predetermined threshold level:
automatically generate a dashboard entry; and
transmit the dashboard entry addressed to a vehicle maintenance operation.

17. The computer program product of claim 16, wherein automatically generating the dashboard entry comprises:
generating information for fields of a dashboard entry;
populating the fields of the dashboard entry with the generated information;

adding the dashboard entry with the populated field to a dashboard; and automatically outputting the dashboard for display.

18. The computer program product of claim 17, wherein the computer-readable program code is further executable to:

upon the calculated probability of a service interruption exceeding a predetermined threshold level:
automatically generate a fault event message; and
transmit the fault event message addressed to a maintenance server;

wherein automatically generating the fault event message comprises:
creating an electronic mail (e-mail) message;
addressing the e-mail to a designated e-mail address of the operator;
formatting the body of the e-mail to include a plurality of fields of information related to the fault event; and
automatically transmitting the e-mail; and wherein the information related to the fault event includes at least one of:
an identification of the fault event;
a hyperlink that directs a computer to maintenance instructions to correct the fault event;
a list of parts for maintenance to correct the fault event;
availability of parts
a hyperlink that directs a computer to a computer system for ordering one or more parts from the list of parts; and
temporary solutions to operate the vehicle with the fault event.

19. The computer program product of claim 15, wherein the vehicle is a fleet of similar vehicles, wherein the total number of instances of the fault event for the vehicle includes a total number of instances of the fault event for the fleet of vehicles, and wherein the total number of instances of service interruptions for the fault event for the vehicle includes the total number of service interruptions for the fault event for the fleet of vehicles.

20. The computer program product of claim 19, wherein the fleet of similar vehicles is a fleet of aircraft.

21. The computer program product of claim 15, wherein the calculated probability of a service interruption for the fault event is proportional to the total number of instances of the fault event for the vehicle divided by the total number of instances of service interruptions for the fault event for the vehicle.

* * * * *